(12) United States Patent
Ogata (10) Patent No.: US 12,148,217 B2
(45) Date of Patent: Nov. 19, 2024

(54) MONITORING DEVICE, AND MONITORING METHOD

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 144 days.

(21) Appl. No.: 17/910,603

(22) PCT Filed: Mar. 31, 2020

(86) PCT No.: PCT/JP2020/014908
§ 371 (c)(1),
(2) Date: Sep. 9, 2022

(87) PCT Pub. No.: WO2021/199328
PCT Pub. Date: Oct. 7, 2021

(65) Prior Publication Data
US 2023/0134029 A1 May 4, 2023

(51) Int. Cl.
*G06V 20/52* (2022.01)
*G06V 10/56* (2022.01)
*G08G 1/07* (2006.01)
*G08G 1/095* (2006.01)

(52) U.S. Cl.
CPC ............. *G06V 20/52* (2022.01); *G06V 10/56* (2022.01); *G08G 1/07* (2013.01); *G08G 1/095* (2013.01)

(58) Field of Classification Search
CPC .......... G06V 20/52; G06V 10/56; G08G 1/07; G08G 1/095
USPC ....................................................... 340/915
See application file for complete search history.

(56) References Cited

U.S. PATENT DOCUMENTS

| | | | | |
|---|---|---|---|---|
| 2003/0016288 A1* | 1/2003 | Kaylor | ................... | H04N 7/181 348/E7.086 |
| 2007/0008176 A1* | 1/2007 | Sirota | .................... | G08G 1/095 340/907 |
| 2011/0095908 A1* | 4/2011 | Nadeem | .................... | G08G 1/20 340/905 |
| 2014/0048581 A1 | 2/2014 | Ota et al. | | |
| 2016/0225258 A1* | 8/2016 | Aparicio Ojea | ....... | G08G 1/097 |
| 2018/0090057 A1* | 3/2018 | Ma | .......................... | G08G 1/097 |

(Continued)

FOREIGN PATENT DOCUMENTS

| | | |
|---|---|---|
| JP | H09-190598 A | 7/1997 |
| JP | H11-232589 A | 8/1999 |
| JP | 2000-259994 A | 9/2000 |

(Continued)

OTHER PUBLICATIONS

International Search Report for PCT Application No. PCT/JP2020/014908, mailed on Jul. 7, 2020.

(Continued)

*Primary Examiner* — Kerri L McNally (57) ABSTRACT

Provided is a monitoring device comprising: a control information acquisition unit that acquires control information transmitted from a control center with respect to a traffic signal; a checking unit that checks whether the state of a lighting face of a lamp of the traffic signal captured by a camera is consistent with the control information; and a notification unit that transmits a notification to a predetermined apparatus if an abnormality is detected as a result of the checking.

9 Claims, 9 Drawing Sheets

(56) References Cited

U.S. PATENT DOCUMENTS

2020/0005634 A1\* 1/2020 Shuff .................... G08G 1/095

FOREIGN PATENT DOCUMENTS

| | | |
|---|---|---|
| JP | 2006-072912 A | 3/2006 |
| JP | 2013-020421 A | 1/2013 |
| JP | 2017-004295 A | 1/2017 |
| JP | 2017-073019 A | 4/2017 |
| JP | 2019-159458 A | 9/2019 |
| KR | 20140141852 A | 12/2014 |
| WO | 2012/144255 A1 | 10/2012 |
| WO | 2019/207755 A1 | 10/2019 |

OTHER PUBLICATIONS

English translation of Written opinion for PCT Application No. PCT/JP2020/014908, mailed on Jul. 7, 2020.
JP Office Action for JP Application No. 2022-513031, mailed on Sep. 5, 2023 with English Translation.

\* cited by examiner

Fig. 9 ature not assumed by the abnormality monitoring circuit occurs in addition to a failure of the abnormality monitoring circuit itself or a micro-processing unit (MPU) failure of PTL 1, it is not possible to notify the control center or the like of the occurrence of the abnormality, and the response may be delayed.
MONITORING DEVICE, AND MONITORING METHOD This application is a National Stage Entry of PCT/JP2020/014908 filed on Mar. 31, 2020, the contents of all of which are incorporated herein by reference, in their entirety.

TECHNICAL FIELD

The present invention relates to a monitoring device, a monitoring method, and a program.

BACKGROUND ART

In a signal indication of a traffic signal, a signal control device or the like installed in the vicinity of an intersection performs control such that traffic signals in intersecting directions are switched in synchronization with each other by a certain mechanism such as "fixed cycle control" and "traffic sensitive control".

When an abnormality occurs in one of the traffic signals operating under the control, for example, an event (referred to as "blue-blue abnormality") in which both signal indications in the crossing directions become blue may occur. To avoid the abnormality, the traffic signal is provided with an abnormality monitoring circuit.

PTL 1 discloses a traffic signal control device having a function of transmitting emergency information to a control center (central device 6) when detecting the "blue-blue abnormality" or a "timer abnormality" that appears as a non-change in light color (see paragraph 0086).

PTL 2 discloses an in-vehicle information device that increases an index value of a possibility that the vehicle and the moving object collide with each other when an abnormality is detected in a traffic signal at an intersection present in a traveling direction of the vehicle to be subjected to driving support, and makes notification to a driver of the vehicle or controls an operation of the vehicle when the index value is larger than a threshold value.

CITATION LIST

Patent Literature

[PTL 1] JP 2013-020421 A
[PTL 2] WO 2019/207755 A

SUMMARY OF INVENTION

Technical Problem

The following analysis is given by the inventor. When automatic driving is widespread in the future, it is assumed that traffic signals are required to have further correctness of behavior. When a failure mode not assumed by the abnormality monitoring circuit occurs in addition to a failure of the abnormality monitoring circuit itself or a micro-processing unit (MPU) failure of PTL 1, it is not possible to notify the control center or the like of the occurrence of the abnormality, and the response may be delayed.

The invention of PTL 2 has a problem that even when an abnormality occurs in a traffic signal, the fact is notified only to the vehicle. Since the presence or absence of the abnormality of the traffic signal cannot be found unless the vehicle passes, the recognition at the control center may be delayed.

An object of the present invention is to provide a configuration that facilitates an operation check of a traffic signal from a control center.

Solution to Problem

According to a first viewpoint, provided is a monitoring device including a control information acquisition unit that acquires information for controlling a traffic signal, the information being transmitted from a control center, a check unit that checks whether a state of a lighting face of a lamp of the traffic signal matches the control information, the lighting face being imaged by a camera, and a notification unit that transmits a notification to a predetermined device when an abnormality is detected as a result of the checking.

According to a second viewpoint, provided is a monitoring method including a monitoring device acquiring information for controlling a traffic signal, the information being transmitted from a control center, checking whether a state of a lighting face of a lamp of the traffic signal matches the control information, the lighting face being imaged by a camera, and transmitting a notification to a predetermined device when an abnormality is detected as a result of the checking. The method is linked to a specific machine, that is, a monitoring device connected to a camera capable of imaging an indication status of a lamp of a traffic signal.

According to a third viewpoint, a computer program for achieving the function of the monitoring device is provided. The computer program can be recorded in a computer-readable (non-transitory) storage medium. That is, the present invention can also be embodied as a computer program product.

Advantageous Effects of Invention

According to the present invention, it is possible to easily check the operation of the traffic signal.

EXAMPLE EMBODIMENT

First, an outline of an example embodiment of the present invention will be described with reference to the drawings.

The reference numerals in the drawings attached to this outline are attached to respective elements for convenience as an example for assisting understanding, and are not intended to limit the present invention to the illustrated aspects. Connection lines between blocks in the drawings and the like referred to in the following description include both bidirectional and unidirectional. The unidirectional arrow schematically indicates a flow of a main signal (data), and does not exclude bidirectionality. Although there are ports and interfaces at connection points of input to output of each block in the drawing, they are not illustrated. In the following description, "A and/or B" is used to mean at least any of A and B.

Figure 1:
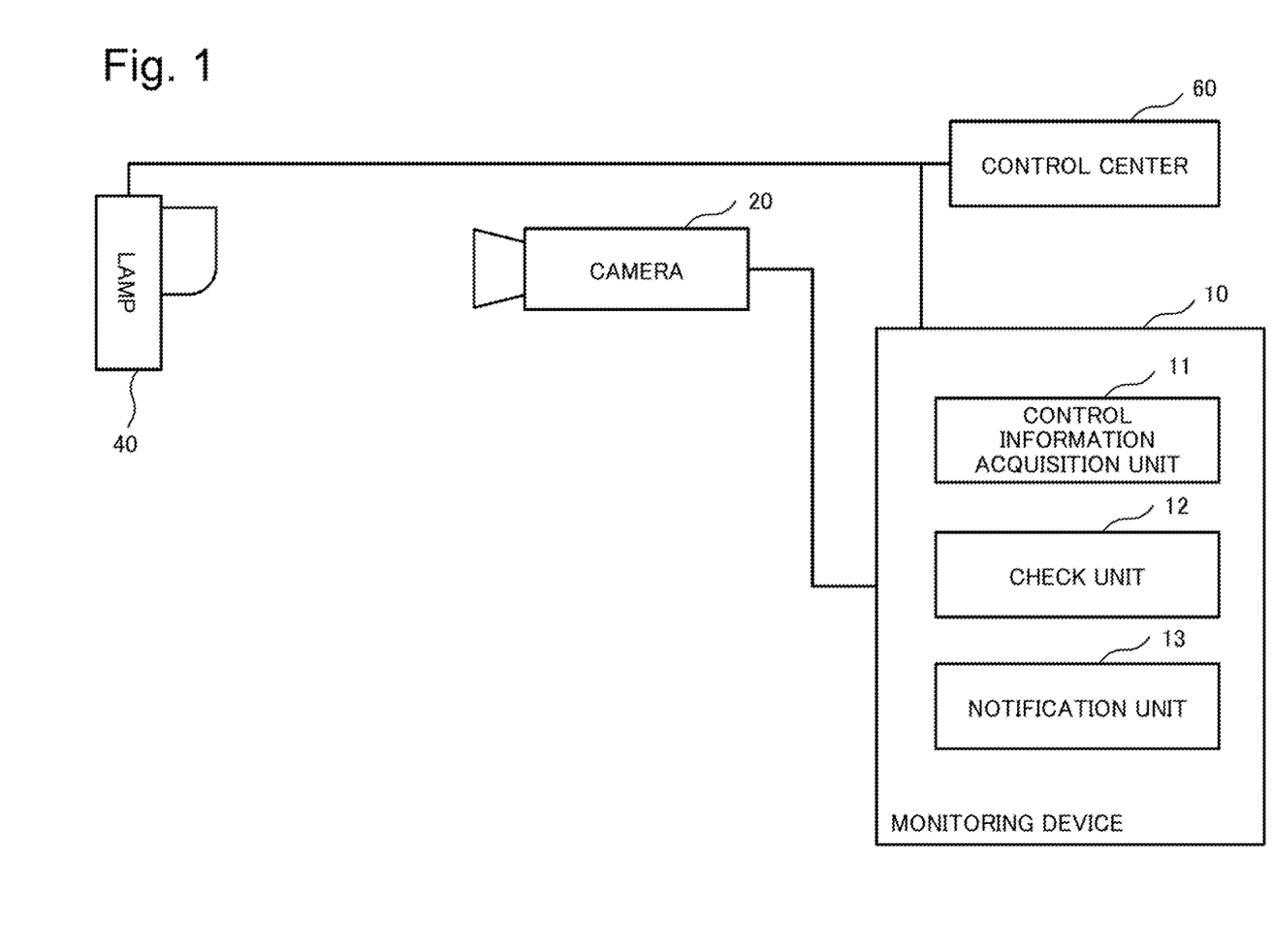
FIG. 1 is a diagram illustrating a configuration of an example embodiment of the present invention.

In an example embodiment of the present invention, as illustrated in FIG. 1, the present invention can be achieved by a monitoring device 10 capable of acquiring a captured image from a camera 20 capable of capturing an image of a lighting face of a lamp of a traffic signal. More specifically, the monitoring device 10 includes a control information acquisition unit 11, a check unit 12, and a notification unit 13.

The control information acquisition unit 11 acquires information, for controlling the traffic signal, transmitted from a control center 60. The control information includes, for example, various types of information in which the control center changes the lighting color of the lamp of the traffic signal at an intended timing.

The check unit 12 checks whether the state of the lighting face of a lamp 40 of the traffic signal imaged by the camera 20 matches the control information.

In a case where an abnormality is detected as a result of the checking, the notification unit 13 transmits a notification to a predetermined device.

Figure 2:
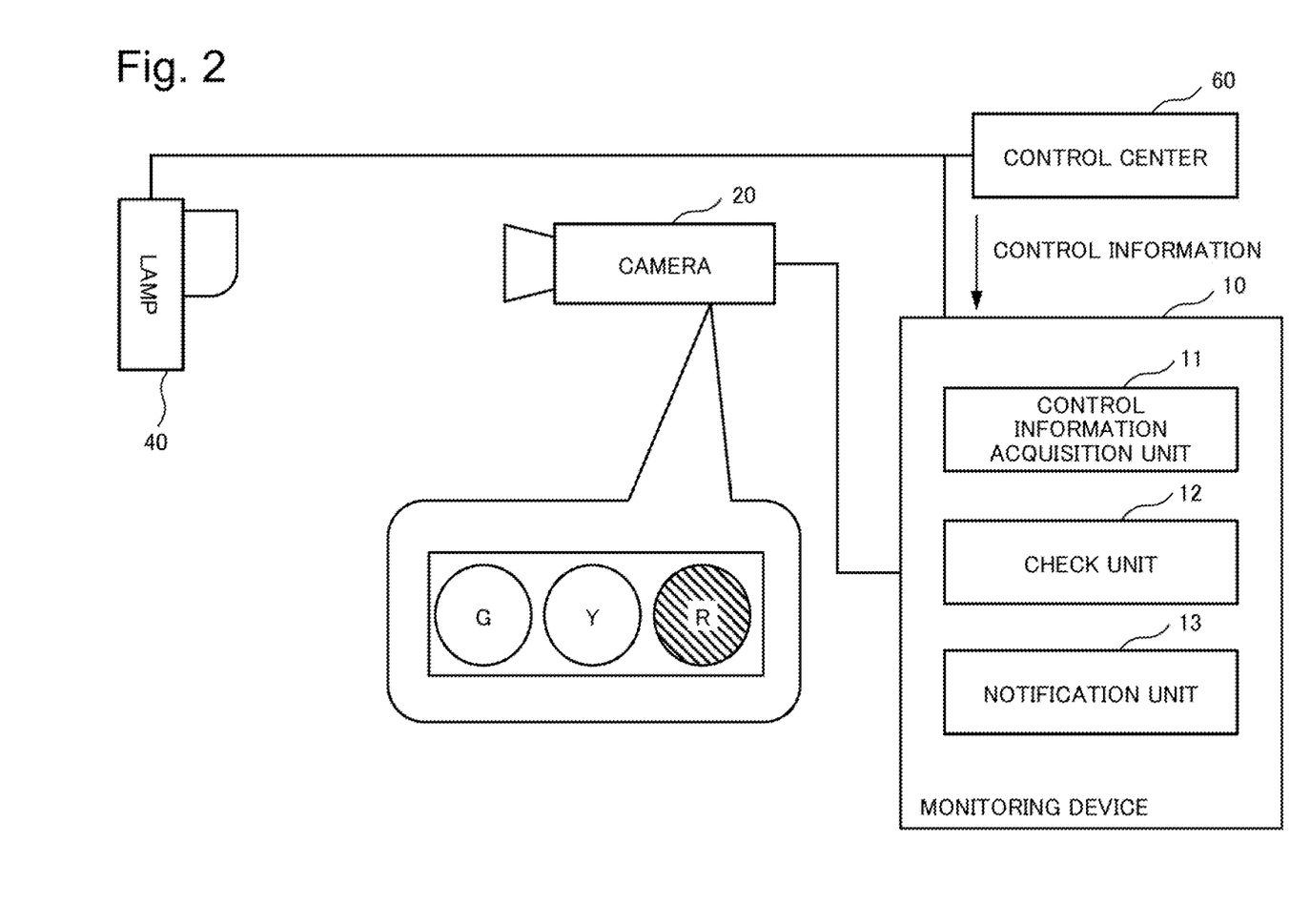
FIG. 2 is a diagram for explaining an operation of an example embodiment of the present invention.

For example, when the lighting color of the lamp 40 of the traffic signal imaged by the camera 20 is red (R) as illustrated in FIG. 2, the check unit 12 checks whether the lighting color of the lamp 40: red (R) matches the control information acquired by the control information acquisition unit 11. In the following description, the lighting color of the signal lamp is described in accordance with the Vienna Convention on road signs and signals, with red lighting being "Stop" and green lighting being "Proceed", but the lighting color of the signal lamp is appropriately changed in accordance with the traffic regulations of each country. In Japan, a green light is also referred to as a "blue light" because it is defined as a "blue light" by a cabinet order.

As a result of the check, when the control information acquired by the control information acquisition unit 11 and the lighting color of the lamp 40: red (R) do not match, the check unit 12 determines that the traffic signal is abnormal and instructs the notification unit 13 to make a notification. The notification unit 13 having received the instruction transmits a notification for notifying a predetermined device, for example, the management terminal of the control center 60 of an abnormality of the traffic signal.

Figure 3:
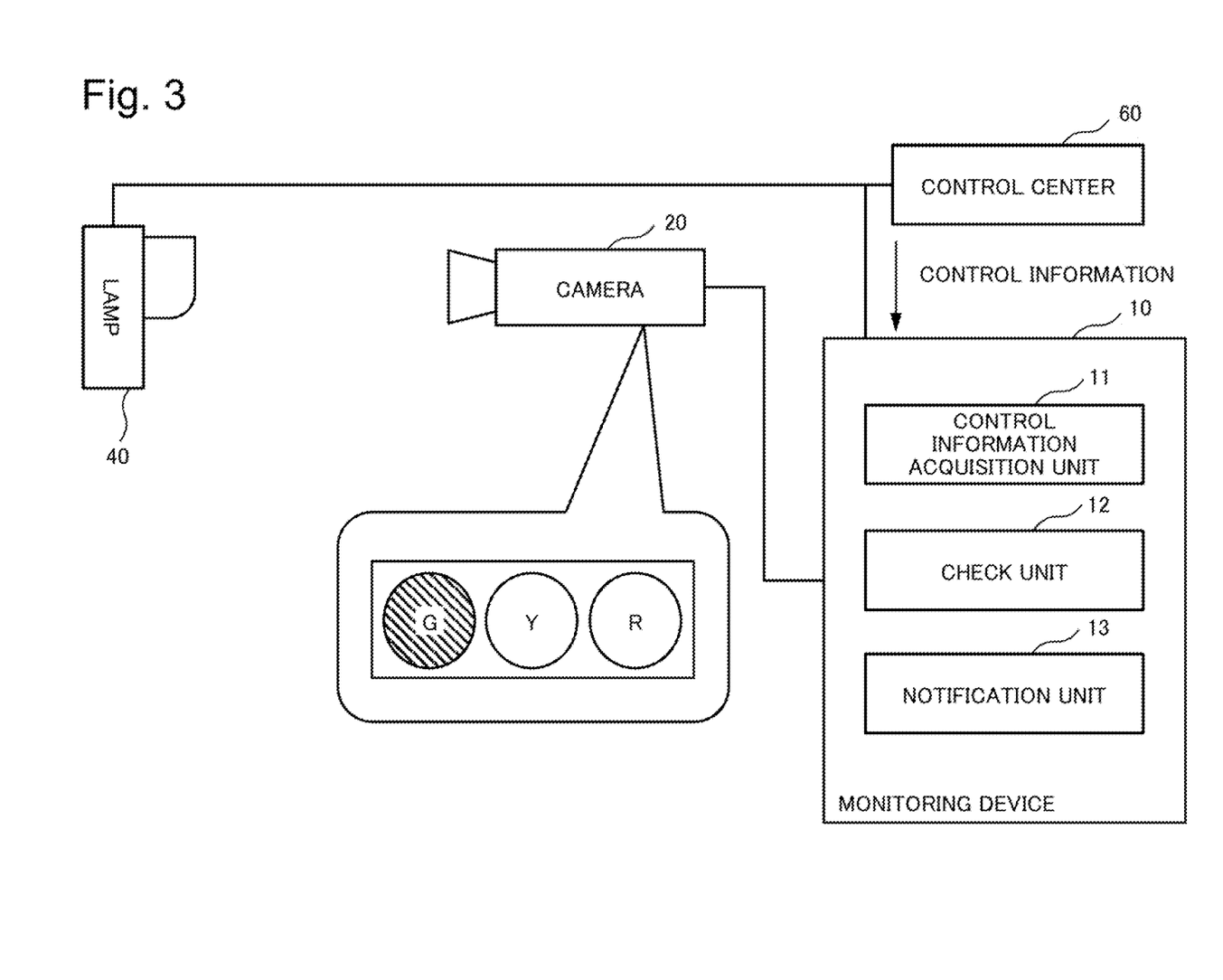
FIG. 3 is a diagram for explaining an operation of an example embodiment of the present invention.

Similarly, when the lighting color of the lamp 40 of the traffic signal imaged by the camera 20 is green (G) as illustrated in FIG. 3, the check unit 12 checks whether the state of the lighting face of the lamp 40 matches the control information acquired by the control information acquisition unit 11. Then, when the control information acquired by the control information acquisition unit 11 and the lighting color of the lamp 40: green (G) do not match, the check unit 12 determines that the traffic signal is abnormal and instructs the notification unit 13 to make a notification.

As described above, the monitoring device 10 of the present example embodiment can check whether the state of the lighting face of the lamp 40 matches the control information acquired by the control information acquisition unit 11, and makes a notification to a predetermined device when there is an abnormality. Specifically, as is clear from the above description of the operation, the present invention can cope with a failure mode not assumed by the abnormality monitoring circuit in addition to a failure of the abnormality monitoring circuit itself and an MPU failure provided in the traffic signal.

First Example Embodiment

Figure 4:
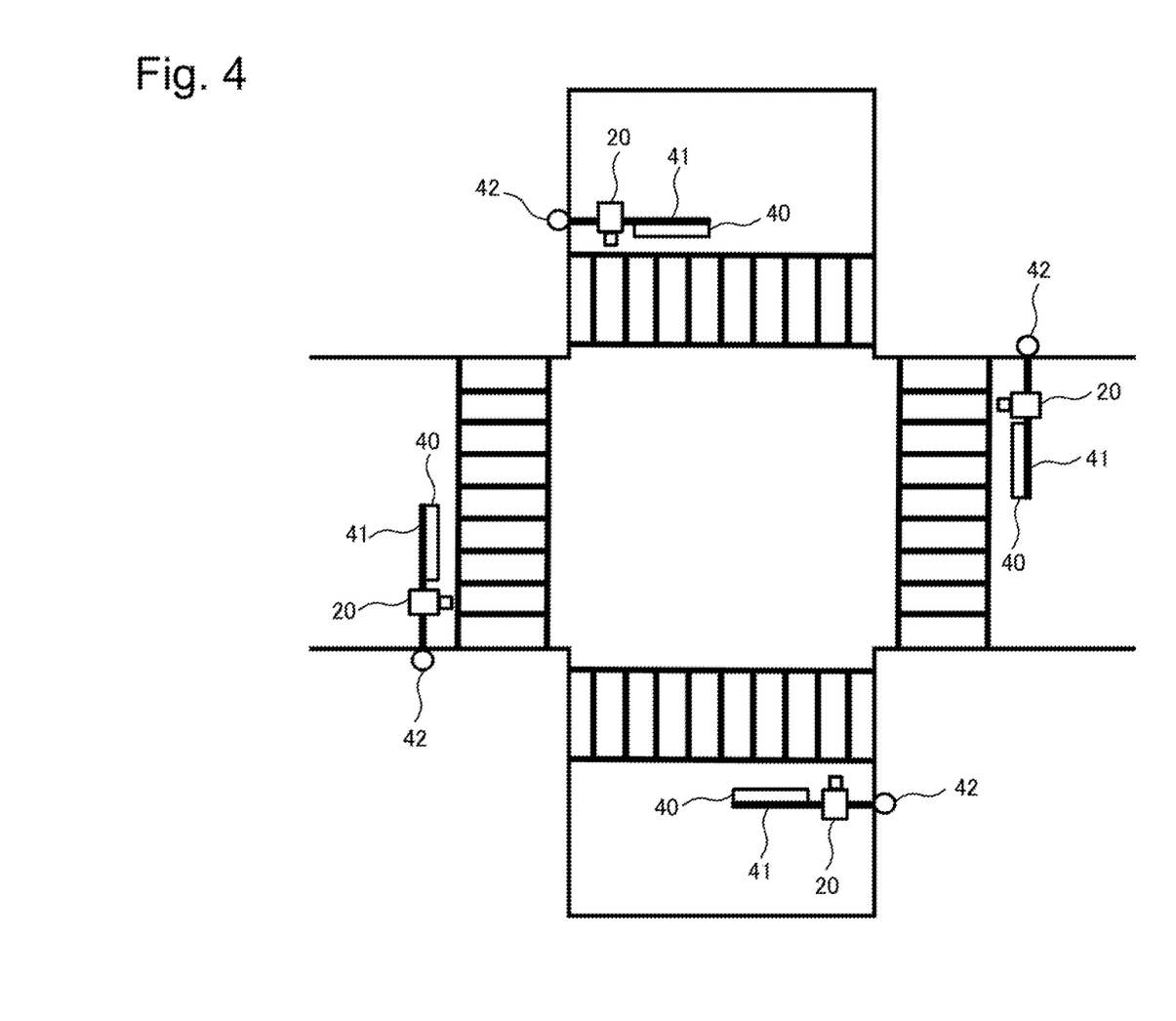
FIG. 4 is a diagram illustrating an example of an intersection where a monitoring device of the first example embodiment of the present invention is installed.

Next, a first example embodiment of the present invention will be described in detail with reference to the drawings. FIG. 4 is a diagram illustrating one of intersections where the monitoring device according to the first example embodiment of the present invention is installed. Referring to FIG. 4, an intersection is illustrated in which two sets of traffic signal lamps 40 are installed facing a vehicle or the like entering the intersection. The lamp 40 of each traffic signal is supported by an arm 41 extending from a roadside post 42. Further, each of four cameras 20 are installed on the arm 41 in such a way as to be able to image the lighting face of each of the lamps 40 facing each other. The camera 20 may be a camera that images a vehicle entering an intersection, a pedestrian crossing a crosswalk, and the like.

Figure 5:
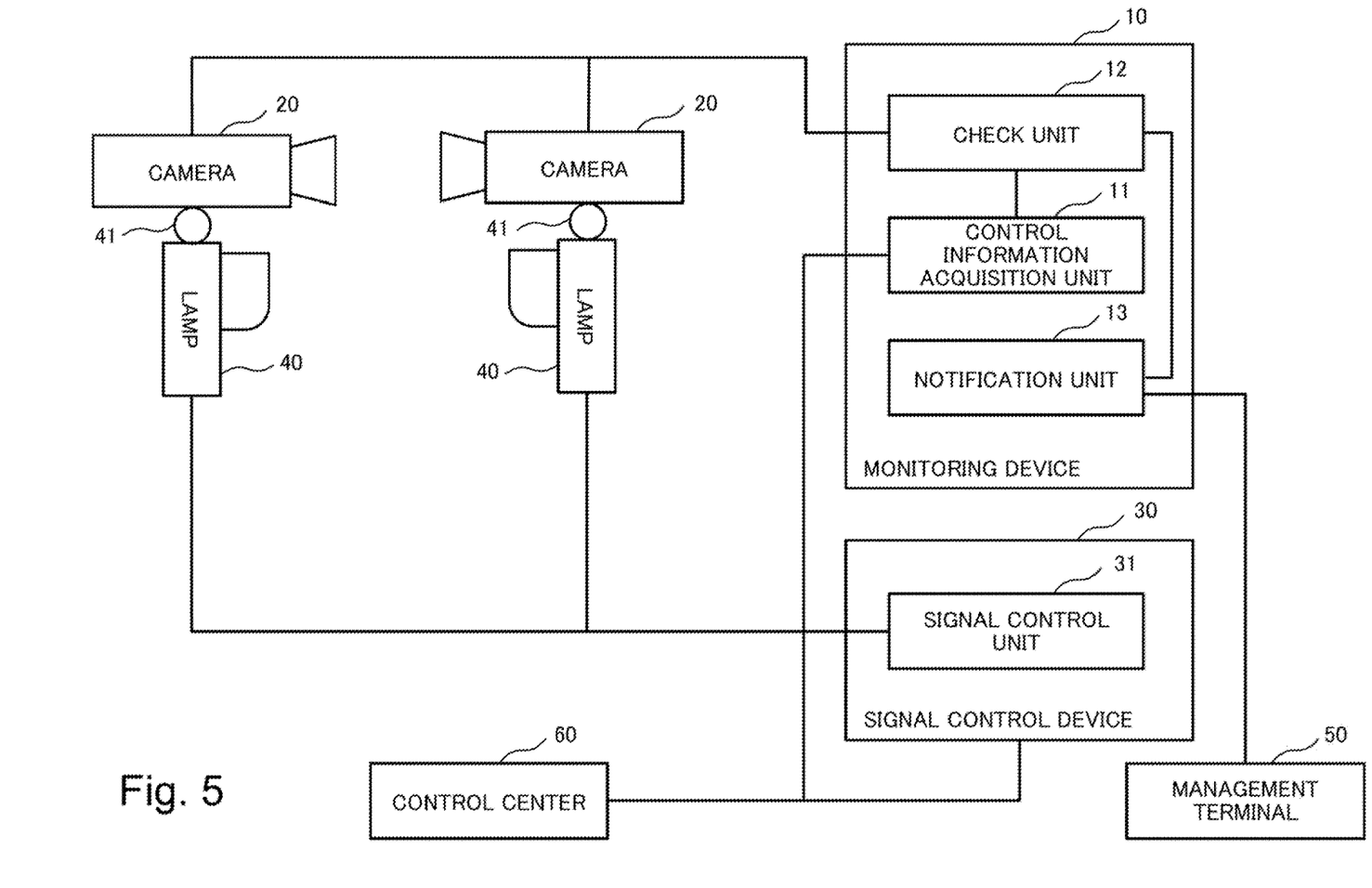
FIG. 5 is a block diagram illustrating a configuration of the monitoring device according to the first example embodiment of the present invention.

FIG. 5 is a block diagram illustrating a configuration of the monitoring device according to the first example embodiment of the present invention. Referring to FIG. 5, the monitoring device 10 connected to the cameras 20 facing each other, a signal control device 30, and a management terminal 50 is illustrated.

The camera 20 is installed above the arm 41 supporting the lamp 40 and directed to the lamp 40 of the facing traffic signal. In the example of FIG. 5, two cameras and two lamps 40 are illustrated, but the other two cameras 20 and two lamps 40 in the cross direction are omitted. Here, in a case where the lamp 40 on the left side of FIG. 5 is a first lamp, the lamp on the right side of FIG. 5 is a second lamp, and the camera on the right side of FIG. 5 is installed near the second lamp. Similarly, in a case where the lamp 40 on the right side in FIG. 5 is the first lamp, the lamp on the left side in FIG. 5 is the second lamp, and the camera on the left side in FIG. 5 is installed near the second lamp. As described above, by symmetrically installing the lamp and the camera, the processing of the images obtained from the two cameras can be made common, and the synchronization determination of the operation and the like are also facilitated.

The signal control device 30 is a device including a signal control unit 31 that controls the lighting states of the four lamps 40 of the traffic signal based on the control information received from the control center 60.

The management terminal 50 is a terminal of a person in charge of traffic control of the control center 60.

The monitoring device 10 includes the control information acquisition unit 11, the check unit 12, and the notification unit 13. The control information acquisition unit 11 acquires the control information transmitted from the control center 60 to the signal control device 30. In addition to a form in which the control information acquisition unit 11 directly acquires the control information from the control center 60, a form in which it acquires the control information transmitted from the control center 60 to the signal control device 30 via the signal control device 30 can also be used as the acquisition form of the control information.

The control information may be, for example, information indicating a behavior of the lamp 40 defined by a cycle length, a split, an offset, and the like in addition to an instruction to directly change a lighting color (signal indication) of the lamp. Here, the "cycle length" indicates a length of one cycle in which the lighting color of the lamp 40 goes around from a certain color and returns to the certain color again. "Split" indicates a ratio indicated by a certain lighting color in one cycle (typically, the lighting ratio of green (blue) in one cycle). The "offset" indicates an amount of shift of a timing to a certain lighting color from an adjacent traffic signal. By applying the cycle, the split, and the offset to the reference time, it is possible to determine which lighting color each lamp 40 should have.

The check unit 12 checks whether the state of the lighting face of a lamp 40 of the traffic signal imaged by the camera 20 matches the control information. Specifically, the check unit 12 cuts out a region of the lamp 40 of the traffic signal from the image captured by the camera 20, recognizes the region, and identifies the lighting color of the lamp 40. Then, the check unit 12 checks whether the lighting color of the lamp 40 identified by the control information described above and the lighting color of the lamp 40 appearing in the camera 20 match, and makes a notification to the notification unit 13 when there is an abnormality. The non-lighting of the lamp 40 can also be detected by the checking process by the check unit 12. The reason is that when the lamp 40 is completely unlit, it means no matching to the lighting color of the lamp 40 identified by the control information.

The check unit 12 of the monitoring device 10 of the present example embodiment has a function of detecting partial non-lighting or breakage of a light emitting diode (LED) constituting the lamp 40. Such partial non-lighting of the LED and breakage of the lamp 40 can be detected by comparing an image of the lamp 40 captured by the camera 20 with an image (reference image) of a lighting state of a normal lamp captured in advance.

The notification unit 13 transmits a notification to the management terminal 50 when an abnormality is detected as a result of the checking by the check unit 12. A mode of this notification can include a mode of a nonmatch between the lighting color of the lamp 40 identified by the control information checked by the check unit 12 and the lighting color of the lamp 40 appearing in the camera 20.

Figure 6:
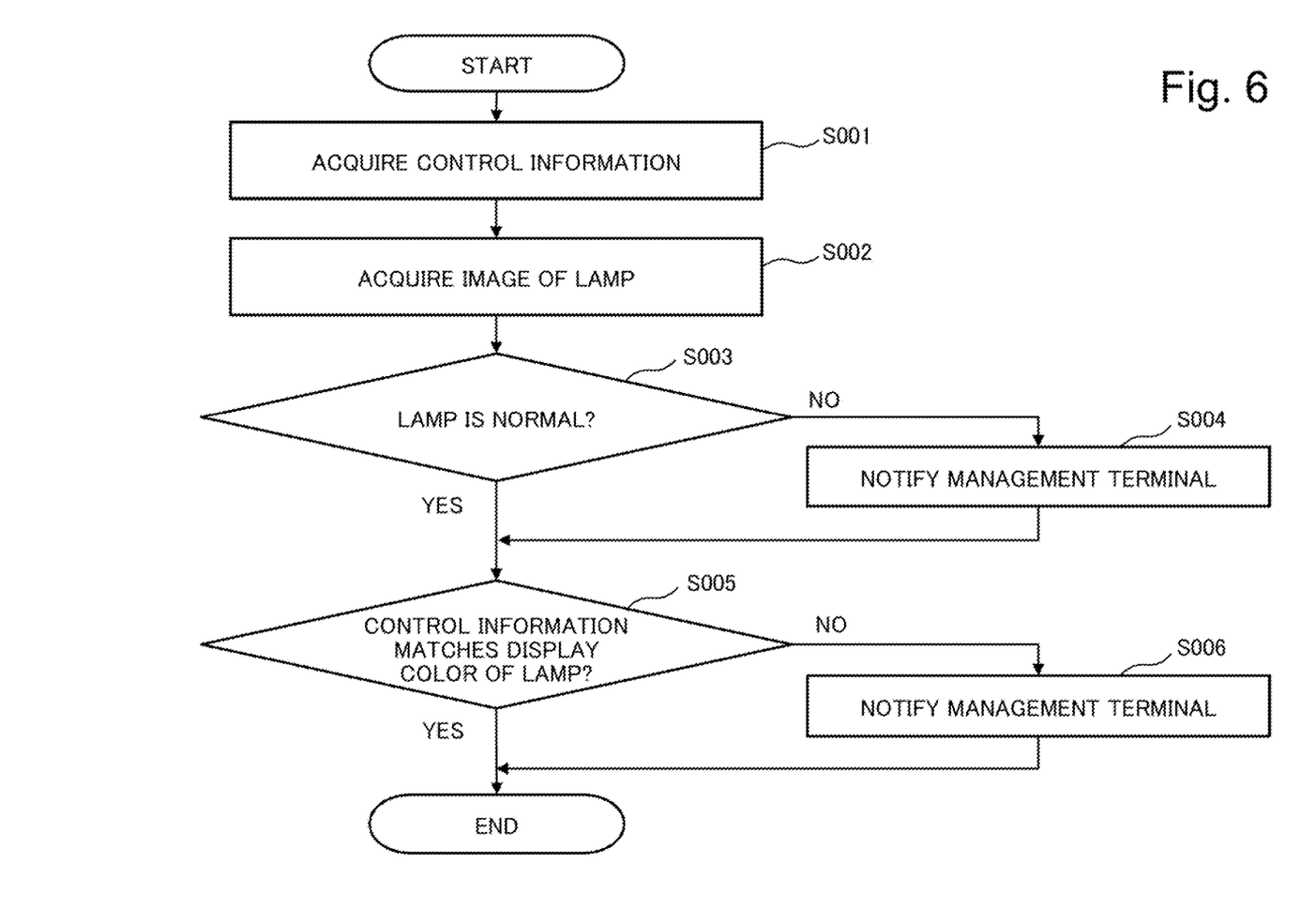
FIG. 6 is a flowchart illustrating an operation of the monitoring device according to the first example embodiment of the present invention.

Next, the operation of the present example embodiment will be described in detail with reference to the drawings. FIG. 6 is a flowchart illustrating an operation of the monitoring device according to the first example embodiment of the present invention. Referring to FIG. 6, first, the monitoring device 10 acquires control information from the control center 60 (step S001). In a case where the control information is information such as a cycle length, a split, and an offset, and the monitoring device 10 already holds the same information, step S001 can be omitted.

Next, the monitoring device 10 acquires an image of the lamp 40 of the traffic signal from the camera 20 (step S002).

Next, the monitoring device 10 compares the image of the lamp 40 of the traffic signal with the image of the lighting state of the normal lamp captured in advance, thereby checking the presence or absence of abnormality of the lamp 40 (step S003). Here, when it is determined that there is an abnormality in the lamp 40, the monitoring device 10 notifies the management terminal 50 that there is an abnormality in the lamp 40 (step S004).

Next, the monitoring device 10 compares the lighting color of the lamp 40 of the traffic signal identified from the control information with the lighting color of the lamp 40 appearing in the camera 20, thereby checking whether the control information and the lighting color of the lamp 40 match (step S005). Here, when it is determined that the control information and the lighting color of the lamp 40 do not match, the monitoring device 10 notifies the management terminal 50 that there is an abnormality in the lighting of the lamp 40 (step S006).

For example, in a case where the lighting color of the lamp 40 of the traffic signal identified from the control information is red, but the lighting color of the lamp 40 appearing in the camera 20 is other than red, it is suspected that the signal control device 30 or the lamp 40 has failed. The person in charge of traffic control who recognizes the abnormality by the management terminal 50 checks the image of the camera 20 as necessary and then checks the relating traffic signal.

On the other hand, in a case where there is no notification from the monitoring device 10, all the lamps 40 at the relating intersection operate correctly. Therefore, the person in charge of traffic control does not need to check the image of the camera 20 at the relating intersection.

The signal control device 30 that controls the traffic signal may be added to the predetermined device to which the notification unit 13 makes notification. For example, the notification unit 13 transmits, to the signal control device 30, a notification for changing the lighting state of the lamp to a predetermined lighting pattern, so that it is possible to notify a vehicle passing through, a pedestrian therearound, and the like of an abnormality of the traffic signal. The predetermined lighting pattern can include so-called all-red lighting in which the lighting colors of all the lamps are red or blinking lighting for making notification of an abnormality.

As described above, according to the present example embodiment, it is possible to check whether the lamp 40 of the traffic signal is correctly turned on without depending on the abnormality monitoring circuit mounted on the signal control device 30 or the like.

Second Example Embodiment

In the first example embodiment described above, an example in which the traffic signal installed at the intersection is a traffic signal directly controlled by the control center 60 is described, but the present invention can also be applied to a traffic signal not directly controlled by the control center 60.

Figure 7:
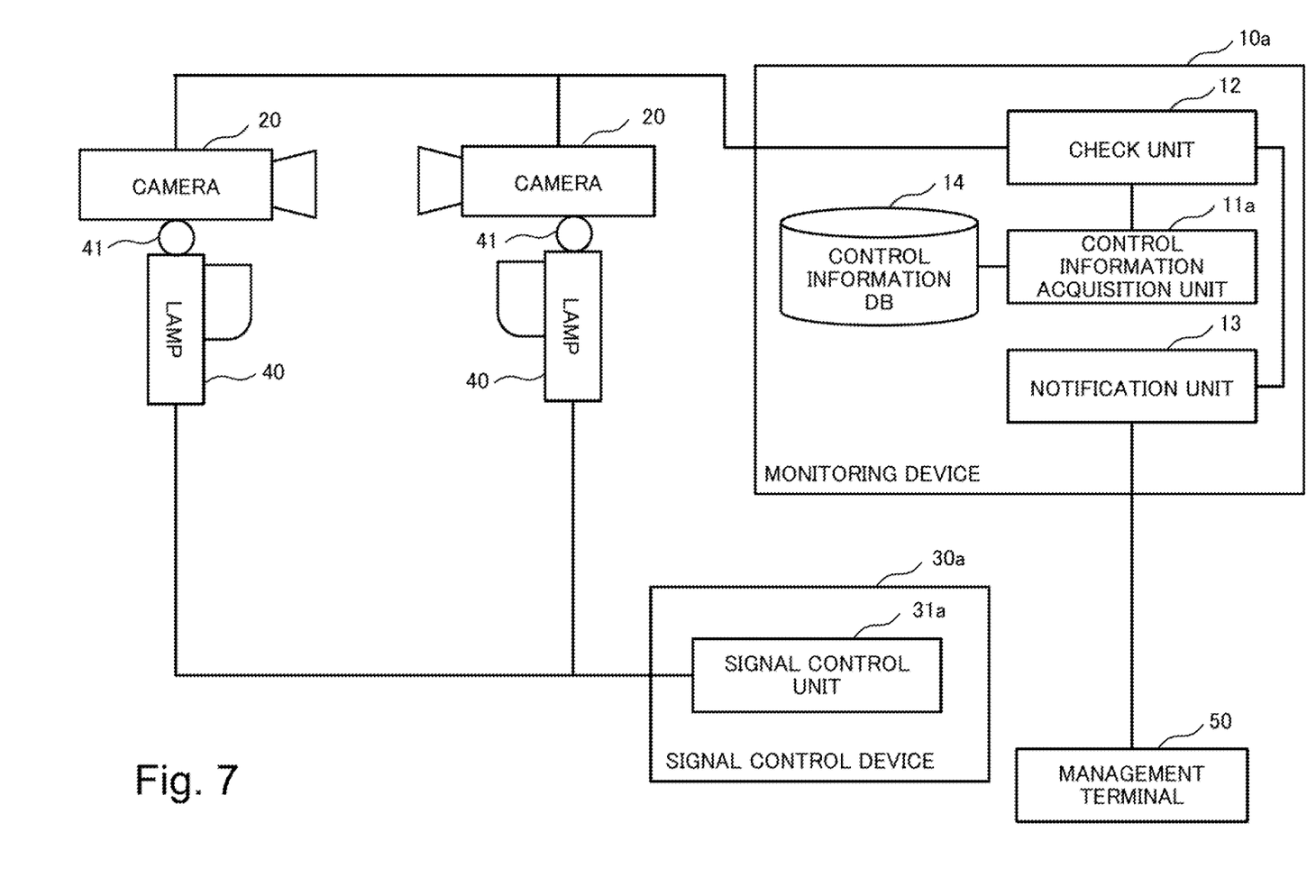
FIG. 7 is a block diagram illustrating a configuration of a monitoring device according to a second example embodiment of the present invention.

FIG. 7 is a block diagram illustrating a configuration of a monitoring device 10a according to a second example embodiment of the present invention. The configuration of the second example embodiment is difference from that of the first example embodiment in that a control information database 14 (control information DB) is included in the monitoring device 10a and a signal control device 30a operates based on of control information set in advance without receiving control from a control center or the like.

The control information DB 14 stores control information (cycle length, split, offset, etc.) set for each traffic signal to be monitored by the monitoring device 10a in association with information identifying the traffic signal. In a case where the traffic signal to be monitored includes a time difference signal that changes a cycle length or a split according to a certain rule in accordance with a time zone, the control information DB 14 holds these pieces of information.

The signal control device 30a can be used for a traffic signal that changes the lighting color of the lamp 40 in a certain pattern based on the cycle length, the split, the offset, or a device known as a time difference signal control device that changes the cycle length or the split according to a certain rule according to a time zone.

Therefore, a control information acquisition unit 11*a* of the monitoring device 10*a* of the present example embodiment extracts the control information set for each traffic signal to be monitored from the control information DB 14, not from the control center, and sends the control information to the check unit 12.

The check unit 12 checks whether the state of the lighting face of the lamp 40 of the traffic signal imaged by the camera 20 match the control information identified as described above. The notification unit 13 transmits a notification to the management terminal 50 when an abnormality is detected as a result of the checking by the check unit 12. Other operations are the same as those of the first example embodiment, and thus description thereof is omitted.

As is apparent from the above description, the present invention can also be applied to monitoring of traffic signals that operate without being controlled by a control center. As in the first example embodiment, in the present example embodiment, it is possible to check whether the lamp 40 of the traffic signal is correctly turned on without depending on an abnormality monitoring circuit mounted on the signal control device 30 or the like.

Although the example embodiments of the present invention have been described above, the present invention is not limited to the above-described example embodiments, and further modifications, substitutions, and adjustments can be made without departing from the basic technical idea of the present invention. For example, the device configuration, the configuration of respective elements, and the expression form of data and the like illustrated in the drawings are examples for assisting the understanding of the present invention, and are not limited to the configurations illustrated in the drawings. For example, in the first example embodiment described above, an example in which the present invention is applied to a general intersection where two roads intersect is described, but the aspect of the intersection to which the present invention can be applied is not limited thereto. For example, the present invention can also be applied to monitoring the behavior of a pedestrian traffic signal at a crosswalk with the pedestrian traffic signal. In this case, the camera 20 is installed at a position where the lamp of the pedestrian traffic signal can be imaged.

The present invention is also applicable to monitoring traffic signals installed on a T-shaped road, a Y-shaped road, a five-way road, or the like, in addition to the intersection where two roads cross each other in a cross shape. In these cases, there is a case where there is no lamp 40 or no post supporting the lamp 40 at a position facing a certain lamp, but the camera 20 may be disposed at a position where the certain lamp 40 can be imaged using an existing structure or the like.

Figure 8:
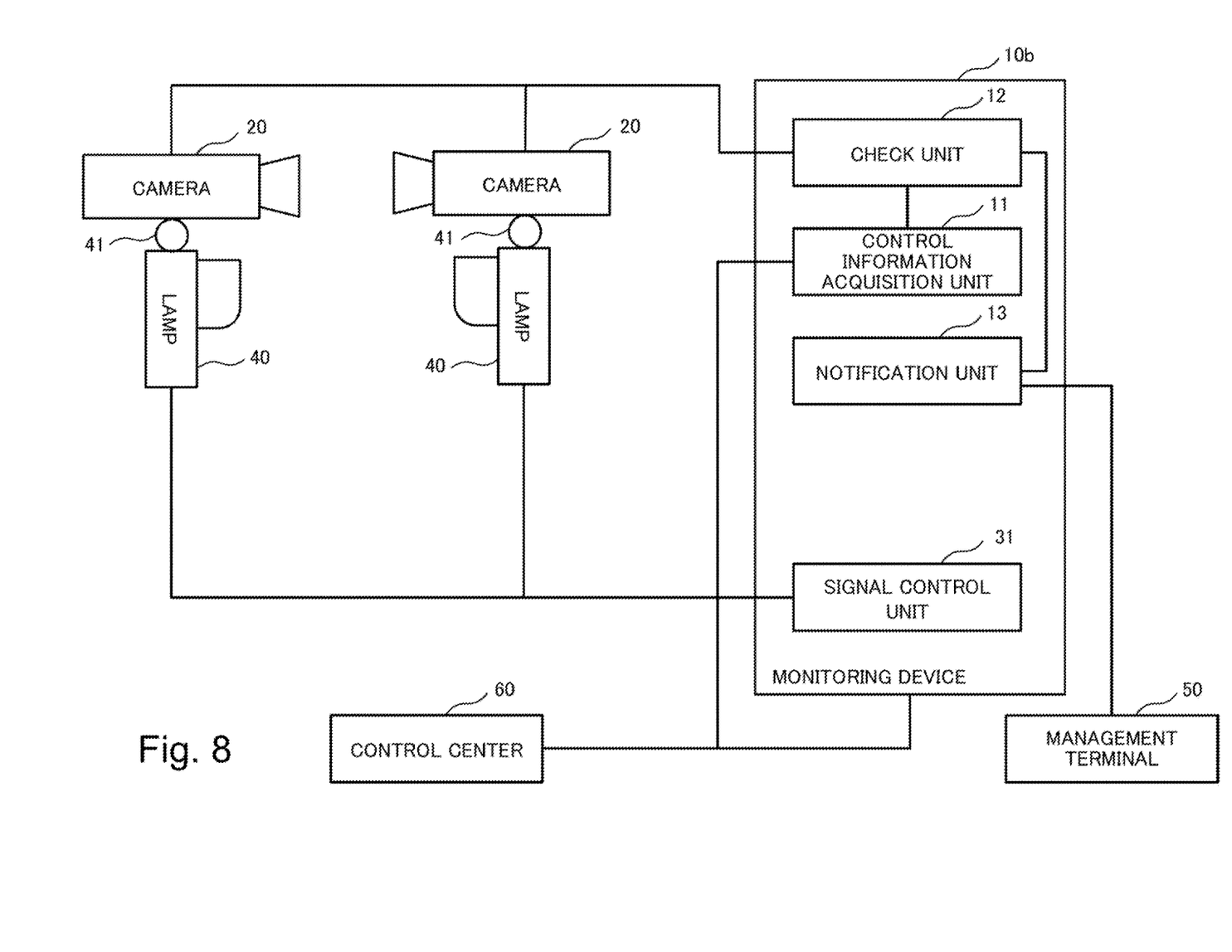
FIG. 8 is a block diagram illustrating a configuration of a monitoring device according to a third example embodiment of the present invention.

For example, in the above-described example embodiment, the monitoring device 10, 10*a* is disposed independently of the signal control device 30, but as illustrated in FIG. 8, a monitoring device 10*b* including the signal control unit 31 and integrated with the signal control device can be used (third example embodiment).

Figure 9:
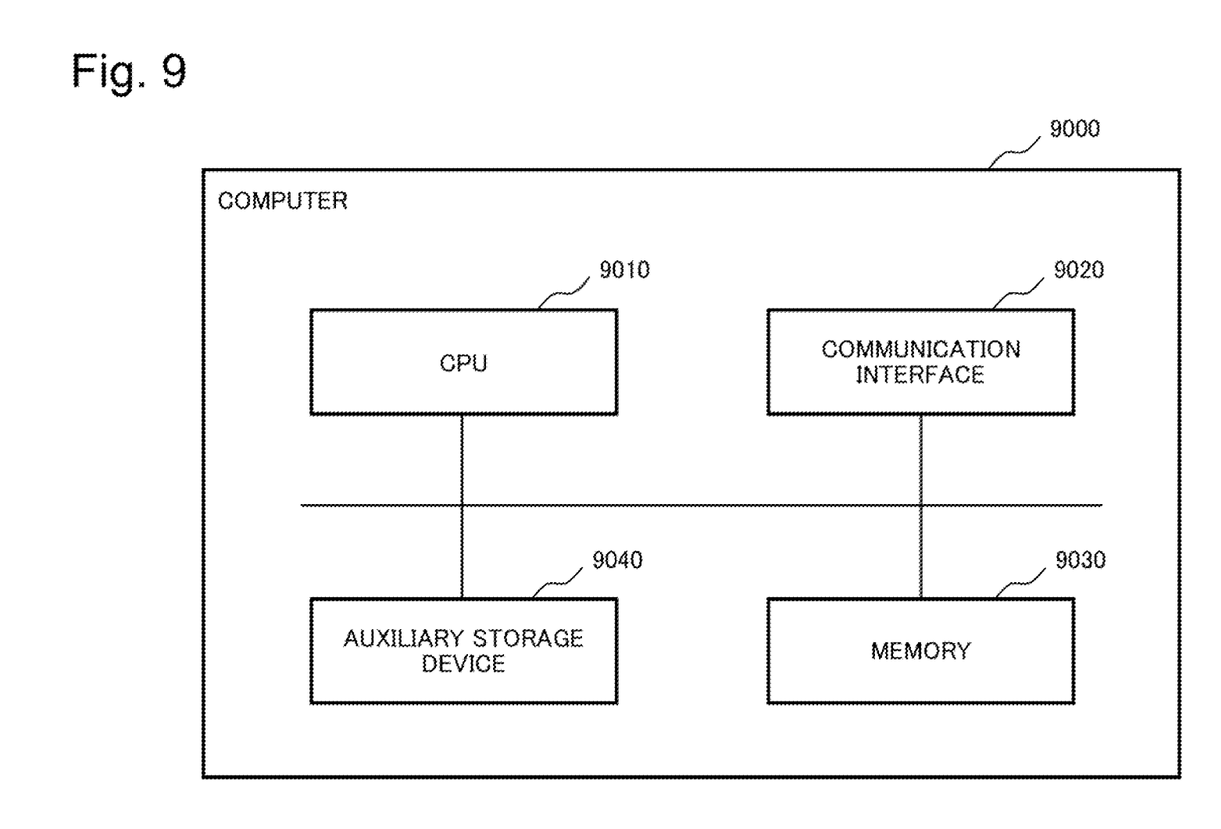
FIG. 9 is a diagram illustrating a configuration of a computer that can function as the monitoring device of the present invention.

The procedure described in each of the above example embodiments can be achieved by a program for causing a computer (9000 in FIG. 9) functioning as a monitoring device to achieve functions as these devices. Such a computer is exemplified in a configuration including a central processing unit (CPU) 9010, a communication interface 9020, a memory 9030, and an auxiliary storage device 9040 in FIG. 9. That is, the CPU 9010 of FIG. 9 may execute the control information acquisition program and the light matching determination program.

That is, each unit (processing means and function) of the monitoring devices 10, 10*a*, and 10*b* can be achieved by a computer program that causes a processor mounted on these devices to execute each processing described above using hardware thereof.

Finally, preferred forms of the present invention are summarized.

First Embodiment (See the monitoring device from the first viewpoint)

Second Embodiment

The camera of the monitoring device described above can include a camera installed near a second lamp installed facing a first lamp of a traffic signal.

Third Embodiment

In the monitoring device described above, it is also preferable that the notification unit transmits, to a signal control device that controls the traffic signal, a notification for changing a lighting state of a lamp to a predetermined lighting pattern.

Fourth Embodiment

In the monitoring device described above, it is also preferable that the check unit has a function of checking a state of a lighting face of a lamp of the traffic signal.

Fifth Embodiment

In the monitoring device described above, it is possible to adopt a configuration in which the check unit checks a state of a lighting face of a lamp of the traffic signal by comparing a reference image of the lighting face of the lamp of the traffic signal with an image of the lighting face of the lamp of the traffic signal, the image of the lighting face being captured by the camera.

Sixth Embodiment

The notification transmitted from the monitoring device to the predetermined device can include a lighting color of the lamp identified by the control information and a lighting color of the lamp imaged by the camera.

Seventh Embodiment (See the monitoring method from the second viewpoint)

Eighth Embodiment (See the program recording medium from the third viewpoint)

As in the first embodiment, the seventh to eighth embodiments can be developed into the second to sixth embodiments.

The disclosure of the above Patent Literatures is incorporated herein by reference. Within the frame of the entire disclosure (including the claims) of the present invention, it is possible to change and adjust the example embodiments or examples further based on of the basic technical idea thereof. Various combinations or selections (including partial deletions) of various disclosure elements (respective elements of each claim, respective elements of each example embodiment or example, respective elements of each drawing, and the like are included.) can be made within the frame of the disclosure of the present invention. That is, it goes without saying that the present invention includes various modifications and corrections that can be made by those of ordinary skill in the art in accordance with the entire disclosure including the claims and the technical idea. Specifically, for numerical ranges set forth herein, any numerical value or sub-range included within the range should be construed as being specifically described, even when not stated otherwise.

REFERENCE SIGNS LIST 10, 10a, 10b monitoring device
11, 11a control information acquisition unit
12 check unit
13 notification unit
14 control information database (control information DB)
20 camera
30 signal control device
31 signal control unit
40 lamp
41 arm
42 post
50 management terminal
60 control center
9000 computer
9010 CPU
9020 communication interface
9030 memory
9040 auxiliary storage device

What is claimed is:

1. A monitoring device comprising:
one or more memories storing instructions; and
one or more processors configured to execute the instructions to:
acquire control information for controlling a traffic signal, the control information being transmitted from a control center;
check whether a state of a lighting face of a first lamp of the traffic signal matches the control information, the lighting face being imaged by a camera; and
transmit a notification to a predetermined device when an abnormality is detected as a result of the checking, wherein
the predetermined device is a signal control device, and
the notification is for changing a lighting state of a second lamp to a predetermined lighting pattern for notifying a vehicle and a pedestrian of the abnormality.

2. The monitoring device according to claim 1, wherein the camera is installed near the second lamp installed facing the first lamp of the traffic signal.

3. The monitoring device according to claim 1, wherein the one or more processors are configured to execute the instructions to:
check a state of the lighting face of the first lamp of the traffic signal.

4. The monitoring device according to claim 3, wherein the one or more processors are configured to execute the instructions to:
check the state of the lighting face of the first lamp of the traffic signal by comparing a reference image of the lighting face of the first lamp of the traffic signal with an image of the lighting face of the first lamp of the traffic signal, the image of the lighting face being captured by the camera.

5. A monitoring device comprising:
one or more memories storing instructions; and
one or more processors configured to execute the instructions to:
acquire control information set to a traffic signal;
check whether a state of a lighting face of a first lamp of the traffic signal matches the control information, the lighting face being imaged by a camera; and
transmit a notification to a predetermined device when an abnormality is detected as a result of the checking, wherein
the predetermined device is a signal control device, and
the notification is for changing a lighting state of a second lamp to a predetermined lighting pattern for notifying a vehicle and a pedestrian of the abnormality.

6. The monitoring device according to claim 1, wherein the notification includes a lighting color of the second lamp identified by the control information and a lighting color of the first lamp imaged by the camera.

7. A monitoring method performed by a monitoring device and comprising:
acquiring control information for controlling a traffic signal, the control information being transmitted from a control center;
checking whether a state of a lighting face of a first lamp of the traffic signal matches the control information, the lighting face being imaged by a camera; and
transmitting a notification to a predetermined device when an abnormality is detected as a result of the checking, wherein
the predetermined device is a signal control device, and
the notification is for changing a lighting state of a second lamp to a predetermined lighting pattern for notifying a vehicle and a pedestrian of the abnormality.

8. The monitoring device according to claim 5, wherein the notification includes a lighting color of the second lamp identified by the control information and a lighting color of the first lamp imaged by the camera.

9. The monitoring device according to claim 1, wherein the predetermined lighting pattern includes all-red lighting in which the lighting color of both the first lamp and the second lamp are red or blinking light.

* * * * *